(12) United States Patent
Falquete (10) Patent No.: US 9,541,366 B2
(45) Date of Patent: Jan. 10, 2017

(54) THERMAL SHOCK TUBE AND THE PROCESS OF PRODUCTION THEREOF

(71) Applicant: IBQ INDUSTRIAS QUIMICAS S/A, Parana (BR)

(72) Inventor: Marco Antonio Falquete, Curitaba Paran (BR)

(73) Assignee: IBQ INDUSTRIAS QUIMICAS S/A, Parana (BR)

( * ) Notice: Subject to any disclaimer, the term of this patent is extended or adjusted under 35 U.S.C. 154(b) by 0 days.

(21) Appl. No.: 14/467,960

(22) Filed: Aug. 25, 2014

(65) Prior Publication Data
US 2014/0366762 A1    Dec. 18, 2014

Related U.S. Application Data

(63) Continuation-in-part of application No. 10/944,921, filed on Sep. 17, 2004, now abandoned.

(51) Int. Cl.
| | |
|---|---|
| C06B 33/00 | (2006.01) |
| C06C 5/00 | (2006.01) |
| F42D 1/04 | (2006.01) |
| B29C 47/10 | (2006.01) |
| B29C 47/06 | (2006.01) |
| C06B 33/12 | (2006.01) |
| C06C 5/04 | (2006.01) |
| B29K 23/00 | (2006.01) |

(Continued)

(52) U.S. Cl.
CPC ............. *F42D 1/043* (2013.01); *B29C 47/065* (2013.01); *B29C 47/1009* (2013.01); *C06B 33/12* (2013.01); *C06C 5/04* (2013.01); *B29K 2023/0625* (2013.01); *B29K 2105/0005* (2013.01); *B29K 2105/251* (2013.01); *B29K 2995/0094* (2013.01); *B29L 2023/22* (2013.01)

(58) Field of Classification Search
CPC .............. C06C 5/00; C06C 5/04; C06B 33/00; F42D 1/04
See application file for complete search history.

(56) References Cited

U.S. PATENT DOCUMENTS

| | | | | |
|---|---|---|---|---|
| 3,745,077 A | * | 7/1973 | Jones ....................... | C06B 33/00 148/24 |
| 4,757,764 A | * | 7/1988 | Thureson ................... | C06C 5/04 102/275.7 |

(Continued)

*Primary Examiner* — Aileen B Felton
(74) *Attorney, Agent, or Firm* — Ming Chow; Sinorica, LLC (57) ABSTRACT

A spark generating tube includes a single tube and a pyrotechnical mixture. The single tube only has a single layer of plastic material, such as ethylene vinyl acetate (EVA) and polyethylene. The pyrotechnical mixture has formed a thin layer in contact with the single layer of the single tube. The pyrotechnical contains an oxidizer, a reducing agent, a substance with low temperature of Tammann and an agent for lubricating and adhering, wherein the agent for lubricating and adhering is either talc or graphite, and the reducing agent can be an aluminum powder in microscale. During the process for manufacturing a spark generating tube, the mixture of the oxidizers and additives is formed separately from the reducing agent. The final mixture is obtained only in the single tube formed with an extruder. In this way, only a very small amount of pyrotechnic mixture is formed at any instant.

16 Claims, 3 Drawing Sheets

(51) Int. Cl.
    *B29K 105/00*     (2006.01)
    *B29L 23/00*      (2006.01)

(56) References Cited

U.S. PATENT DOCUMENTS 5,212,341 A      5/1993  Osborne
5,837,924 A  *  11/1998  Austin .................... C06C 5/04
                                                    102/275.11
5,866,842 A  *   2/1999  Wilson ................... C06B 31/28
                                                    149/19.6

\* cited by examiner

(Prior Art)

Figure 3

THERMAL SHOCK TUBE AND THE PROCESS OF PRODUCTION THEREOF

The current application is a continuation-in-part of and claims a priority to U.S. Ser. No. 10/944,921, which claims a foreign priority to PI 0303546-8 filed in Brazil on Sep. 19, 2003. The BR PI0303546-8 has been granted as a patent on Jan. 8, 2013.

FIELD OF THE INVENTION

The present invention relates generally to explosive signal transmission device. More particularly, it is a thermal shock tube and the method of manufacturing the same with improved composition and safety.

BACKGROUND OF THE INVENTION

Shock tubes, which are also referred as non-electric detonators, are a type of low energy signal fuses. They have been widely used for connecting and initiating explosive charges in the mining and quarrying industries. They represented a revolution in the market of detonation accessories, due to the ease of connection and application, and to the intrinsic safety against accidental ignition by induction of spurious electric current. There are various types of shock tubes use high explosives as components.

Plastic extrusion may be adopted to form circular tube with an outer diameter varying from 2.0 to 6.0 mm and an inner diameter varying from 1.0 to 5.0 mm. A secondary explosive powder, such as HMX, RDX or 5 PETN, has been introduced into its inner periphery during formation of the tube. The resulting product is known as a non-electric shock tube. When initiated by a primary explosive blasting cap, a conventional shock tube generates a gaseous shock wave with a signal transmission speed ranging from 1,800 to 2,200 m/s. Further improvements may include the addition of aluminum to increase specific energy and utilization of ionomeric polymers, like Surlyn®, to increase adhesiveness of the powder. Conventional shock tube has two layers: an inner layer made of a polymer which provides adhesiveness to the explosive powder mixture, and an outer layer made of a polymer which provides mechanical strength. Surlyn® is most suitable for the inner polymer layer; and polypropylene, polyamide, or polybutene is used for the outer layer. This product was an improvement as Surlyn® alone is expensive and has a low resistance to external damage.

There are also single layer shock tubes, in which the polymer is Linear Low Density Polyethylene (LLDPE) with minor quantities of an adhesive promoter. The tube is made by extrusion of an initial tube with outer and inner diameters greater than that of the final tube. Then the tube is stretched in order to orient the LLDPE molecules, making a final tube with greater tensile strength. However, the best conventional shock tubes continue to be made in two layers, and the inner layer continues to be Surlyn®, as even a low dislodgement of poorly adhered explosive powder may lead to failures in signal propagation due to discontinuities in the powder layer or by concentration of loose powder in the lower parts of the tube during field application. Alternatively, an additional thin layer of a hydrophilic polymer, like such as PVA, is deposited by passing the plastic tube through a solution of polymer in a liquid, e.g. water, and drying the solvent. The aim is to make the tube less permeable to the hydrocarbons present in an emulsion explosive. Hot diesel fuel is particularly aggressive to LLDPE, and prolonged contact of the tube with hot, diesel fuel-based emulsions causes failure in signal propagation. The PVA protective skin is fragile and does not adhere well to the LLDPE, and so a pretreatment with a cleaner, such as chromic acid, with hot air or with an adhesion promoter is necessary.

However, the foregoing products have a number of deficiencies. The production of the tube loaded with explosives (RDX, HMX or PETN are toxic and dangerous) is associated with risks both of accidental explosion and in the handling toxic products, requiring special care and protection in the production line. The fact that molecular explosives are used impedes the dosing of non-active components during the extrusion of the tube. In addition, in the conventional shock tube, the reaction products are basically hot gases which, when leaving the final extremity of the tube, expand with loss of heat, such heat loss inhibiting the ignition of the pyrotechnic delay mixture. Slower delay powders are particularly insensitive to the shock tube output. It is therefore necessary either to add an additional column of a sensitive pyrotechnic mixture to give continuity to the explosive train or to use pyrotechnic mixtures more sensitive to heat and with larger column length. As a consequence, the final product has greater production costs, and the processing and handling of the pyrotechnic mixture entails significant accidental ignition risks.

Moreover, the adherence of crystalline explosives (RDX, HMX or PETN) in plastic tubes is low, demanding special manufacturing processes and the use of special, and expensive, polymers, usually ionomeric polymers such as Surlyn®, in order to minimize the concentration of loose powder in portions of the tube and to insure uniformity of distribution. Lack of adherence of LLDPE is particularly noteworthy. It is significant that the best known commercial brands of shock tube continue to use a two layer tube, with Surlyn® as the inner layer, in spite of the efforts to improve polymer adhesiveness by changes in polymer formulation.

Further, conventional shock tube loading lacks sufficient critical mass and critical diameter to properly propagate a shock wave by classical detonation theory. The shock wave is continuously sustained by dust explosion of the explosive powder dislodged by deformation of the plastic duct caused by the shock wave behind the reactive front. Due to the foregoing feature, a conventional shock tube fails if there is a cut or a close restriction in the inner duct, dispersing the shock wave. In the field practice, if unexpected cuts, stretching, knots, holes, or closed kinks unexpectedly appear in the tube, the tube can fail to propagate. Conventional shock tubes can fail to propagate after prolonged underwater exposure above 2 bar pressure, as is often found in field practice, due to the hydrophilic characteristics of the ionomeric resins like Surlyn®.

Conventional shock tubes are sensitive to the effect designated in the industry as "snap, slap, and shoot". An unexpected ignition can occur if the tube is stretched causing rupture, in particular conditions of mechanical energy release. Conventional shock tubes are classified for transport purposes as an explosive in many countries, which results in additional costs and difficulties for transportation, especially after the increase in dangerous products regulations resulting from the fight against terrorism. Tubes manufactured with Surlyn® alone have a low tensile strength, and a low resistance to abrasion, kinks, knots, etc., demanding co-extrusion of an additional outer layer of polyethylene. This improved process still includes the use of expensive Surlyn®.

Conventional explosive powders lack sufficient activation energy to propagate in case of contamination of the tube interior by hot hydrocarbons (most likely diesel fuel) from explosive emulsions. Polymers, including LLDPE, are quite susceptible to aggression. Minor quantities of adherence-improving additives, typically EVA copolymers, are even more subject to attack by volatile fractions of diesel fuel. An additional skin of hydrophilic polymer like PVA is needed, but abrasion resistance of the skin, particularly in the rough environmental conditions found in field practice, is remarkably bad, causing removal of the skin and failures of the tube.

Conventional shock tube speeds of deflagration range from 1,800 to 2,200 m/s, or within 10% of a mean speed of 2,000 m/s. On the other hand, the electronic delay blasting cap is characterized by its highly accurate electronic delay element. As a result, when using a conventional shock tube to initiate such as electronic delay blasting cap, it was possible that the high speed of the shock tube interferes with the accuracy of the delay element. In other words, the relatively broad range interferes with the accuracy of the delay element timing. The timing error of a certain length of tube is added to the intrinsic timing error of the electronic circuit. In a typical tube length of 21 m, as used in open pit mining, the error would be within +/−1 ms, while the intrinsic error of the electronic circuits is typically within +/−0.1 ms. Conventional shock tube deflagration generates substantially gaseous reaction products, sustaining a shock wave that quickly disperses most of the released thermal energy, through the expansion of the gases as they leave the tip of the tube. For this reason, a conventional shock tube output is unable to ignite low flame sensitive delay mixtures, demanding an additional, highly flame sensitive, igniter element for ignition of the slower delay elements. Highly flame-sensitive mixtures are usually also highly sensitive to mechanical shock, friction and electrostatic discharge, increasing the risks of accidental detonation. The additional element also increases the manufacturing costs.

A further development in low energy transmission fuses was the tubes that make use of pyrotechnic mixtures inside the tube, as substitutes for the high-explosive-containing powders. A circular tube formed via plastic extrusion with an outer diameter ranging from 2.0 to 6.0 mm, and an inner diameter ranging from 1.0 to 5.0 mm. A powder of pyrotechnic mixture of $K_2Cr_2O_7$+Al or Mg, $Fe_2O_3$+Al or Mg, or $Sb_2O_3$+Al or Mg, $Sb_2O_5$+Al or Mg or $O_2$+Al or Mg, is introduced in the inner periphery of the tube during formation of the tube. The resulting product is designated as a pyrotechnic shock wave tube. When initiated by a primary explosive detonator, such a tube generates an aluminothermy reaction without gas releases, and develops plasma for energy transmission. Signal transmission tubes are usually complemented with the insertion of a delay blasting cap in the tip of the tube. The blasting cap is made of a metal cap containing two layers of explosive powder pressed inside. The bottom layer is a secondary high explosive, and the upper layer is a primary, flame sensitive explosive. The cap further includes a delay element consisting of a metallic cylinder containing in its interior a compacted column of powdery pyrotechnic delay mixture and, frequently, an additional column of pyrotechnic mixture sensitive to the heat generated by the tube's shock wave.

However, a typical pyrotechnic shock tube has its own drawbacks. The pyrotechnic mixtures use toxic components such as $K_2Cr_2O_7$ and $Sb_2O_3$ and flammable solvents. It demands recycling of the solvents, and creating handling issues and requiring appropriate waste disposal. The process of extrusion of the plastic tube includes the dosing of a previously prepared sensitive pyrotechnic mixture during the formation of the plastic tube, with safety risks in handling and processing. A pyrotechnic shock tube does not resist aggression from the hydrocarbons present in emulsion explosives, and prolonged exposure leads to failures in propagation.

In addition, due to the high Tammann temperature of the components, the mixture of $Fe_2O_3$+Al or Mg were also not shown to be feasible in practice, because of low sensibility of these pyrotechnic mixture to the ignition stimulus of blasting caps and a high rate of propagation failures. Mixtures of $O_2$+Al or Mg were not shown to be feasible in practice, due to the loss of gases in the production and use of the product. On the other hand, the formulation of $K_2Cr_2O_7$ and $Sb_2O_3$, $Sb_2O_5$ with Al or Mg is highly toxic and highly friction and shock sensitive. Further, reaction products formed in the aluminothermy reactions have low thermal conductivity, which inhibits the ignition of slower, low sensitive delay elements. Moreover, the powdered pyrotechnic mixture also presents a low adherence to the tube polymer, particularly in LLDPE. Pyrotechnic mixtures are not optimized to allow propagation through closed knots, cuts or kinks.

Therefore, the present invention is aimed to solve the above described deficiencies, thus to provide a safe and effective shock tube.

DETAIL DESCRIPTIONS OF THE INVENTION

All illustrations of the drawings are for the purpose of describing selected versions of the present invention and are not intended to limit the scope of the present invention.

One objective of the present invention is to provide a thermal shock tube and a process of manufacturing the same, which employ an optimized pyrotechnic mixture with improved toxicity and safety. More specifically, in its formulation, the poisonous components of the pyrotechnic mixture have been removed. The product has Desensitization of the mixture to shock and friction. It has Decreases handling risks of the pyrotechnic mixture. Furthermore, it has also made improvement in the adherence of the mixture to the inner surface of the tube. In this way, it is capable of adopting automated manufacturing processes for the pyrotechnic mixtures that were formerly labor intensive, including grinding and re-crystallization with dangerous solvents, and handling the pyrotechnic mixture by automated, risk-free, and environmentally-safe processes, as well as generation of an optimized spark with excellent heat transfer by conduction and convection without dispersion of heat by gas expansion.

The present invention allows continuous dosing and mixture of two non-active components during the extrusion process. The components are essentially insensitive to friction and shock before mixture, thereby substantially reducing the probability of accidental initiation in handling, and, in case of ignition of the tube during production, minimizing the damages by the deflagration of a very small amount of mixture. It would yield a safer pyrotechnic mixture, with smaller sensibility to friction and mechanical shock, by covering the oxidizer components with a desensitizing additive. The product has a larger sensibility and sensitivity of propagation, propagation even with cuts or holes, and low risk classification for transport. The thermal shock tube resists environmental exposure to marine diesel fuel present in hot explosive emulsions, maintaining functionality even after 72 hours of exposure at high temperature. For example, it may maintain its normal function in pure marine diesel for at least 24 hrs at 65° C. and at least 48 hrs at 40° C. The spark of signal transmission is formed as much by gases as by melted metals, and so it crosses knots, closed kinks or obstructions in the tube, and presents an optimized heat transport by thermal conduction and convection, igniting less sensitive, slower delay columns directly.

The pyrotechnic mixture has an excellent adherence to the plastic tube, using low cost, common polymers, including LLDPE, and avoiding tube portions with lack or excess of charge.

The thermal shock tube has propagation speed accuracy within +/−1.67% from the mean speed, i.e., an error of +/−20 m/sin 1,200 m/s, adding to electronic delay detonators only +/−0.3 ms of error in a 21 m long tube.

As introduced above, the shock tube is used as a signal transmission device for connecting and initiating explosive columns, or as a flame conductor. The device is usually complemented by a delay element, or it can be used as a delay unit. The shock tube uses a pyrotechnic mixture with low sensitivity to ignition by shock or friction, with low toxicity. It generates a spark with superior, thermal performance. The manufacturing process utilizes continuous and separated dosing of the individual non-active components, in conjunction with the formation of the plastic tube, making the process safer and yielding a more accurate dosing. The shock tube of the present invention gives the following additional advantages: use of low toxicity components, use of ordinary, low cost, low adhesiveness polymers, and generation of a spark that propagates through knots, closed kinks or tube obstructions, and resistance to failure by attack of components of hot explosive emulsions. The focus of the present invention is to obtain desirable characteristics in the polymers that form the tube, but not to optimize the pyrotechnic mixtures formulation, in order to use ordinary, low cost polymers. The new approach is also multipurpose, i.e., to obtain the greatest possible number of desirable characteristics through the formulation of the pyrotechnic mixture. The process and product from this invention have the following advantages over the current art shock tubes.

The present invention has adopted low Tammann temperature substances suitable for pyrotechnic mixture. The examples include potassium perchlorate, potassium chlorate, antimony trisulfide, sulfur, potassium nitrate, ammonium perchlorate, sodium chlorate, or any other suitable substance. According to Tammann's theory, the vibrational energy needed to start an oxidation reduction reaction between solid substances is largely available at the temperature equivalent to half the melting point of the substance, in the absolute scale (K). This temperature of Tammann explains why certain components make pyrotechnic mixtures quite sensitive to heat, flame and mechanical shock, while other pyrotechnic mixtures are quite difficult to start and propagate. For example, mixtures of powdered aluminum, whose temperature of Tammann is 193° C. and ferrous-ferric oxide, whose temperature of Tammann is 632° C. are particularly difficult to start and propagate, while mixtures of powdered aluminum and potassium chlorate, whose temperature of Tammann is only 47.5° C., is especially dangerous.

In the present invention, enough activation energy is obtained to ensure the initiation and propagation of the pyrotechnic reaction even with contamination of the tube core by hydrocarbon fuel coming from the explosive emulsion, such contamination decreasing the enthalpy of the pyrotechnic reaction. A pyrotechnic reaction that generates products with high thermal conductivity and thermal convection coefficient will allow better propagation continuity, and will ignite delay elements with greater thermal efficiency, allowing the use of smaller, slower delay columns without additional ignition elements. In the following reactions, $8\ Al+3\ Fe_3O_4 => 4\ Al_2O_3$ (solid)$+9\ Fe$ (liquid) or, $2\ Al+Fe_2O_3 => Al_2O_3$ (solid)$+2\ Fe$ (liquid), wherein the melted metallic iron supplies an excellent heat transfer, as much by thermal conduction as by convection.

In addition, in the present invention, the products have lubricating properties and superficial adherence properties, which reduce the effects of friction and mechanical shock of the mixture, and provide adhesiveness even to difficult polymers like pure LLDPE. Examples of such products are: talc (magnesium and aluminum hydrosilicate) and graphite.

Moreover, in order to allow propagation through cuts or holes accidentally made in the tube during use, the pyrotechnic mixture was designed so that spark is constituted as much by products of high heat transfer as by gaseous products so that the heat transfer allows continuity of the pyrotechnic signal transmission so as to provide the mechanical impulse for releasing the spark from the open portion of the tube. Since the generation of solid or liquid products will not allow propagation through knots, kinks, restrictions, etc. It is necessary that enough gas volume be generated to allow the elastic expansion of the polymer around the fold or restriction, forcing the propagation of the spark. However, the gas volume cannot be excessive, or there will be dispersal of the solid and liquid products of the spark in the tip of the tube, combined with the gaseous expansion, that will provoke the loss of the thermal energy necessary for ignition of the delay element. Examples of components found to be appropriate for gas generation are antimony trisulfide, potassium perchlorate, potassium nitrate, sodium nitrate, ammonium perchlorate, sodium perchlorate and so on.

Further, another unique feature of the process of the present invention is that the mixture of the oxidizers and additive is done separately from the fuels or reduction agents. The final active mixture is obtained in the plastic extruder, in an automated, continuous or semi-batch process, so that just a very small amount of pyrotechnic mixture is formed at any instant. This minimizes the hazard of an accidental ignition of the tube during production.

The development of the optimized formulation for the thermal shock tube was accomplished by several practical tests. In these tests, formulations of powdered pyrotechnic mixtures were dosed by spraying in the inner diameter of the tube with melted pure LLDPE in an extruder. The tube was cooled, and stretched to obtain a 3.1 mm outer diameter, 1.4 mm inner diameter flexible tube. In addition, conventional Surlyn® shock tubes as well as prior art pyrotechnic shock tubes were sampled and tested as a comparison.

A propagation speed test is important to determine the accuracy in speed of spark propagation. Spark generating tube, which is made with a pyrotechnic inner core, has a slower propagation speed when compared to conventional shock tube, which has an explosive inner core. This speed is inherent to the proposed system, and it doesn't have any harmful effect on the superior thermal performance of its spark.

In the speed of propagation test, a tube portion with a length of 5 m is placed between two optical sensors linked to a precision chronometer. When the tube is ignited, the spark passes the first sensor to trigger the chronometer. When the spark passes the second sensor, the timing is ended. The propagation speed is obtained by dividing 5 by the time measured in seconds.

TABLE 1

| | Propagation Speed | | | |
|---|---|---|---|---|
| Sample Description | Mean Speed (m/s) | Min. Speed (m/s) | Max. Speed (m/s) | Standard Dev. (m/s) |
| Spark-Generating Tube | 1196 | 1186 | 1202 | 6 |
| Shock Tube, double plastic layer | 1946 | 1824 | 2048 | 42 |

In the kink propagation test, in 10 samples, the tube spark should propagate through 10 closed 180° folds spaced by the same distance. This smallest distance among the following 1 m, 50 cm, 30 cm, 20 cm, and 10 cm, in which all 10 samples propagate completely, without failure, is recorded as "minimum distance between kinks".

In the tight knot propagation test: a 1 m long tube sample is single-knotted in its middle section, and the tube extremities are held by a hydraulically-driven traction device, with a loading cell attached to measure the tensile strength to which the knotted tube is submitted. The tube is ignited, and the maximum load in which five successive samples propagate through the knot is recorded. The higher the maximum load, the better the ability of the tube to propagate through tight knots which could accidentally be made in field use. This test was performed for single layer shock tubes, as well as for double-layer (LLDPE and Surlyn®) conventional shock tubes, for comparison.

In the low energy detonating cord initiation test: 100 samples of 1 m long tubes are connected to a line of detonating cord with a core loading of 2 grams/m of PETN, through a "J" type connector, and the detonating cord is initiated. The number of tubes which fail to propagate is recorded as "percentage of failures in initiation by 2 grams/m detonating cord".

In the mechanical shock sensibility test, a sample of the pyrotechnic mixture powder is submitted to a known weight falling hammer, free-falling from a known height. The energy that causes 5 successive samples to deflagrate is recorded. The energy is calculated by the formula $E = m \times g \times h$, where m is the mass of the weight in free fall, g is the local acceleration of gravity, and h is the minimum height for ignition.

In the slower delay sensibility, a delay element of 8.3 seconds delay time, with a 24 mm long column of pressed delay powder, containing slow delay mixture, without any additional igniting mixture, is placed at the end of a PVC tube with a 6 mm outer diameter, with variable length, with the tip of a 1.0 m long thermal shock tube, aligned in the other extremity. When the thermal shock tube is ignited, the spark should cross the free space from the hose interior and start the delay element. The larger the length of the hose in which the elements always ignited, the better the thermal performance of the spark. The largest hose length for ignition in 5 successive samples is recording as sensibility of the slow delay element.

In the tube-to-tube air gap test: a 3 m long thermal shock tube is transversally cut and the tube halves are moved a measured distance apart, maintaining their alignment through an aluminum guide in half-pipe format. The largest distance that the spark can cross the gap between the tube portions and initiate the second portion in 5 successive samples, is recording as all fire air gap.

In the test for initiation after exposure to the hot explosive emulsion: 30 samples of 12 m long thermal shock tube, with the ends sealed by a rubber plug and a crimped aluminum cap, as is usual in the industry, are dipped in 65° C. hot bulk explosive emulsion with marine diesel oil as fuel, and placed in a lab stove at 65° C. for 24 hours. After this period, the stove has its thermostat lowered to 40° C., and the samples stay in the emulsion for 48 more hours, totaling 72 hours of exposure. The tubes are ignited and the percentage of failed tubes is recorded as the failures after exposure to the hot emulsion.

In the test of adherence of the mixture to the tube: 10 tube samples 5 m long are weighed in an analytical scale with an accuracy of 0.0001 g. The interiors of the tubes are flushed by compressed air with a flow rate of 0.3 Nm3/minute for 2 minutes, to remove the non-adhered powder. The tubes are weighed again and the weight is recorded. The interior of the tubes is washed with a flow of sodium hydroxide aqueous solution for dissolution of the aluminum and perchlorate, and iron oxide and talc, eliminating the adhered powder. The empty plastic tube is weighed. After determination of the tube's inner diameter the surface area is calculated and the free powder load by area rate, the adhered powder load by area rate, and the percentile rate of free powder mass by total powder mass are calculated.

TABLE 3

| | | | | | | | | | |
|---|---|---|---|---|---|---|---|---|---|
| | | | | Practical Tests Results | | | | | |
| Formulation | Speed of propagation | Minimum gap between kinks in kink propagation test | Tight knot | Low energy Propagation detonating cord initiation | Shock Sensibility | Slower Delay Sensibility | All-fire air gap | Initiation after exposure to the hot explosive emulsion | Adherence of the mixture to the tube (% of free powder) |
| Al 65% $Fe_3O_4$ 17% $KClO_4$ 17% Talc 1.0% | 750 m/s | Failure at any distance | 3 f-kg | 8% | 9.2 N | 8 cm | 80 mm | 25% | 5% |
| Al 50% $Fe_3O_4$ 24.5% $KClO_4$ 24.5% Talc 1.0% | 1170 m/s | 1 m | 8 f-kg | Zero | 9.2 N | 16 cm | 100 mm | Zero | 3.8% |

TABLE 3-continued

Practical Tests Results

| Formulation | Speed of propagation | Minimum gap between kinks in kink propagation test | Tight knot | Low energy Propagation detonating cord initiation | Shock Sensibility | Slower Delay Sensibility | All-fire air gap | Initiation after exposure to the hot explosive emulsion | Adherence of the mixture to the tube (% of free powder) |
|---|---|---|---|---|---|---|---|---|---|
| Al 40% Fe$_3$O$_4$ 27.5% KClO$_4$ 31.5% Talc 1.0% | 1260 m/s | 30 cm | 11 f-kg | Zero | 9.2 N | 22 cm | 120 mm | Zero | 4.0% |
| Al 30% Fe$_3$O$_4$ 32.5% KClO$_4$ 36.5% Talc 1.0% | 1290 m/s | 30 cm | 12 f-kg | Zero | 9.2 N | 5 cm | 15 mm | 15% | 3.2% |
| Al/K2Cr2O7 Standard for the conventional shock tube | 1000 m/s | Failure at any distance | 3 f-kg | Zero | 3.8 N | 8 cm | 100 mm | 30% | 18.3% |
| Mixture HMX/Al conventional shock tube single layer | 2000 m/s | 1 m | 2 f-kg | Zero | 3.8 N | Fails to ignite even at zero distance | 10 mm | not performed | not performed |
| Mixture HMX/Al conventional shock tube double layer | 2000 m/s | 50 cm | 8 f-kg | Zero | 3.8 N | Fails to ignite, even at zero distance | 10 mm | not performed | not performed |

According to the test results shown in the Table above, the optimal formulation of the present invention would be close to the ratio by weight of constituent components set forth below: Al:Fe$_3$O$_4$:KClO$_4$:Talc=40:27.5:31.5:1.

A high content of aluminum fuel, such as 65% by weight, is associated with a lower speed of 750 m/s. This results in an insufficient spark performance in the propagation through kinks and knots, as well as a very low sensibility to initiate of the slow delay element.

On the other hand, a very low aluminum fuel content, such as 30%, it will generate a very high gaseous volume, dispersing the spark products at the tube tip, reducing the sensibility to initiate of the slow delay element and the all-fire air gap.

It is also noted that in order to obtain the results presented is necessary to use leafing aluminum powder, and make a process to reduce the particle size of the components of the components of the oxidant mixture. The particle size of above mentioned leafing aluminum powder ranges of 6 μm to 20 μm, and of the oxidant mixture ranges of 1 μm to 10 μm.

Further, the results confirm the efficacy of the talc in improving the adherence of the mixture to the tube and in decreasing the mixture shock sensibility.

According, the obtained optimal formulation for the thermal shock tube would be 15 to 32% of powdered aluminum. Other powdered fuels or reduction agents able to generate a high temperature spark, such as magnesium, silicon, boron and zirconium, could also be used.

In addition, it also contains 15% to 35% by weight of powdered ferrous, such as ferric oxide (Fe$_3$O$_4$). Other substances that in oxidation-reduction reactions generate products with high thermal conduction and convection, such as ferric-oxide (Fe$_2$O$_3$), ferrous oxide (FeO), cobalt oxide, cupric oxide (CuO), and cuprous oxide (Cu$_2$O) can also be used.

The substances of low temperature of Tammann can be 20 to 40% by weight of potassium perchlorate (KClO$_4$). Here, the low temperature of Tammann has been defined as 30° C. to 200° C.

Other substances are able to lower the energy of activation of the pyrotechnic reaction and to generate enough gaseous volume to propagate through kinks, knots, or tube restrictions, such as potassium chlorate, potassium nitrate, ammonium perchlorate, sodium perchlorate, sulfur, and antimony trisulfide can also be used.

Finally, the talc could be 0.5% to 3.0% by weight. Other substances able to promote adherence and to reduce shock and friction sensibility, such as graphite, can also be used.

Figure 1:
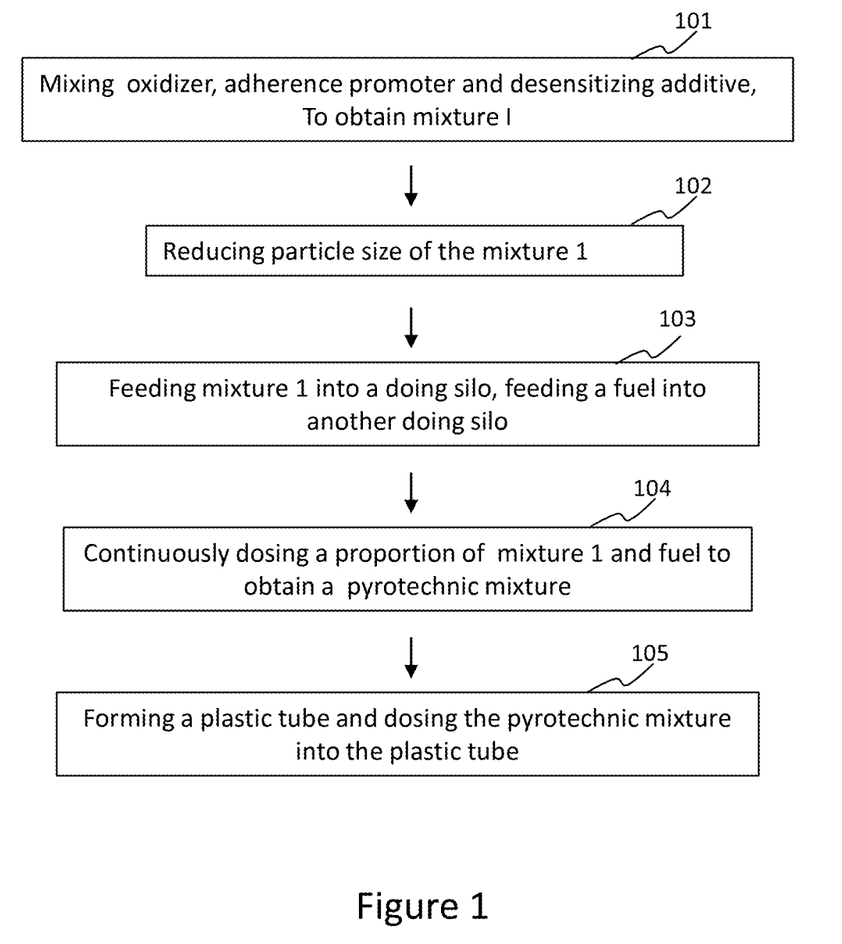
FIG. 1 depicts a process for manufacturing the spark generating tube of the present invention.

The process for manufacturing the above mentioned product of thermal shock tube is advantageous with respect to the existing technologies in the art. The procedures have been summarized in FIG. 1. First, thoroughly mixing oxidizer, the adherence promoter and substance with low temperature of Tammann, so as to obtain a mixture I, wherein the mixture I is free of the fuel (aluminum powder) 101; then reducing the particle size of the mixture I 102 prior to feeding the mixture 1 into a dosing silo, feeding the fuel into another dosing silo 103; next, continuously dosing a balanced proportion of mixture I and the fuel through two parallel dosing thread type devices or through vibratory dosers or any other conventional weight or volume micro-dosing means 104. The micro-dosing means include electric motors with frequency controllers or any other conventional controller in a control loop with the plastic tube extruder, so that balanced doses are continuously reaching a roll homogenizer-mixer with a bottom screen, producing the final sensitive pyrotechnic mixture in small quantities, the bottom screen being connected to the extrusion ring of the plastic tube extruder. And finally, preparing a pyrotechnic mixture, a melted polymer is extruded through the extruder ring forming a plastic tube. While the plastic tube is being formed, the pyrotechnic mixture is introduced by gravity dosing into the plastic tube 105. This yields the desired product, the thermal shock tube. Additional optional processing steps include tube cooling, stretching of the tube to obtain a desired tensile strength, thermal treatment of the tube and the like.

As mentioned above, in this process the mixture of the oxidizers and additive is done separately from the fuels, the final mixture is obtained only in the plastic extruder, so that only a very small amount of pyrotechnic mixture is formed at any instant. This process is different from the known in the prior art, where the mixture is produced previously and sent to the extruder after.

The final product, a thermal shock tube according to the present invention, has a single plastic tube, such as Ethylene vinyl acetate (also known as EVA), polyethylene, LLDPE, etc, with an outer diameter ranging from 2.0 to 6.0 mm, and an inner diameter ranging from 1.0 to 5.0 mm. The tube includes 5 to 40 mg/m of pyrotechnic mixture as a thin layer adhered to its internal walls. The tube is not totally filled with the mixture. If the mixture was not adhered to the wall it could flows during transport and handling depositing in a specific place causing an excess of load that could cause the rupture of the tube when it is initiate, while in other region will have a lack of mixture conducting to a fail. Other undesirable effect is when the mixture not adhered to the wall and flows until the blasting cap, causing variation on the delay time. Moreover, the spark generating tube of the present invention has diameters higher than those of conventional shock tube. Additionally, it is convenient to maintain a minimum internal passage when crimping the blasting cap to the tube. Its standards are as follows:

TABLE 2

Dimensions of spark generating Tube

| Dimension | Range (mm) |
|---|---|
| Internal Diameter | 1.3-1.4 |
| External Diameter | 3.0-3.2 |
| Inner Diameter of Crimping Passage | Min. 0.8 |

It is also noted that the tube of the present invention is a single tube having only a single layer, free of a layer with adhesiveness property. The single layer of the tube is polyethylene. In this case only a single layer tube is necessary, this tube being made by linear low density polyethylene, whose characteristics allow the process of stretch so as to provide mechanical resistance to the tube.

Figure 2:
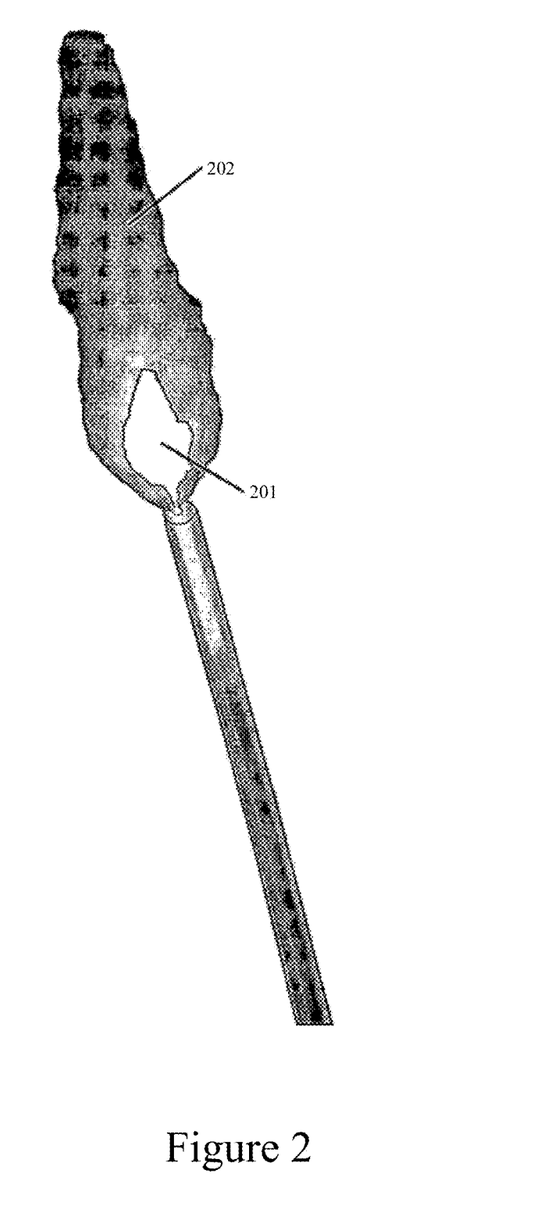
FIG. 2 shows the thermal shock tube spark as it leaves the tube tip.
Figure 3:
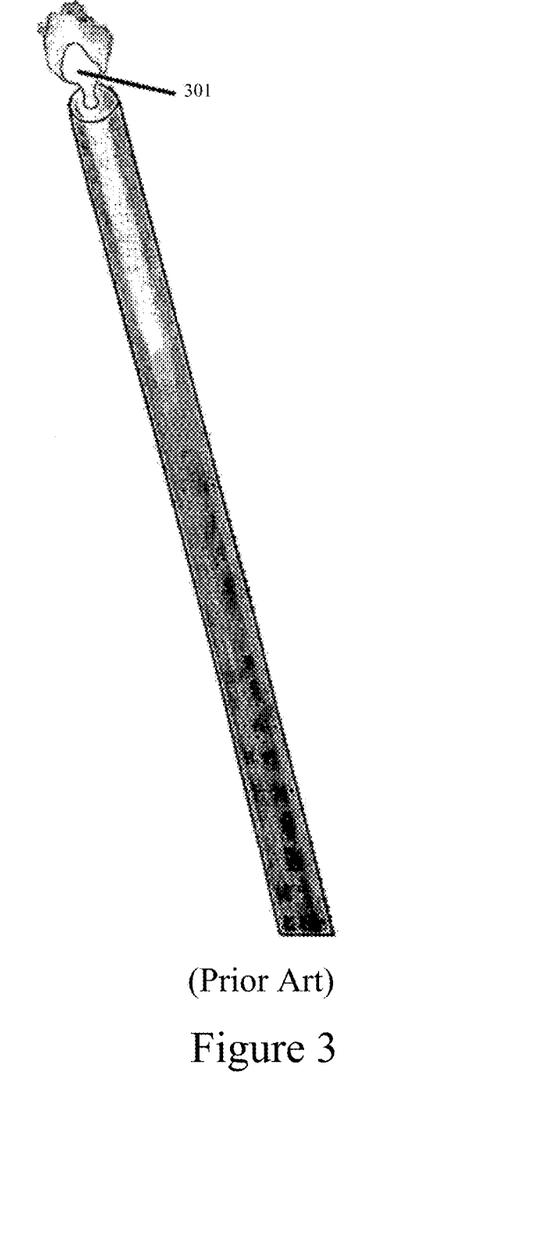
FIG. 3 shows the gaseous products leaving the tube tip of a conventional shock tube.

The obtained product has been compared with the conventional products. In reference to FIG. 2, the thermal shock tube spark as it leaves the tip of the tube during propagation. The drawing represents a high velocity photograph of the tube spark. The high temperature solid and melted products 201, such products including highly thermal conductive and convective melted iron, and the gaseous products 202, which are responsible for the melted jet projection at the tube tip. On the other hand, in reference to FIG. 3, it has shown the basically gaseous products of a conventional shock tube as they leave the tip of tube during propagation. This drawing also represents a high velocity photograph of the tube flame, and it can be seen that the basically gaseous products 301 are being dispersed by gas expansion at the tube's end. These comparative drawings clarify why a conventional shock tube fails to propagate through irregularities in the tube and does not have the ability to ignite low sensitive delay columns.

Although the invention has been explained in relation to its preferred embodiment, it is to be understood that many other possible modifications and variations can be made without departing from the spirit and scope of the invention as herein described.

What is claimed is:

1. A spark generating tube, comprising
   a single tube;
   a pyrotechnical mixture, wherein the pyrotechnical mixture comprising an oxidizer, a reducing agent, a substance with low temperature of Tammann, wherein the low temperature of Tammann refers to 30° C. to 200° C., an agent for lubricating and adhering; the oxidizer, the reducing agent, the substance with a low temperature of Tammann and the agent for lubricating and adhering being in respective powder forms; and the reducing agent being in a leafing form and microscale, wherein the microscale refers to the metric level of 6 μm to 20 μm;
   the single tube formed by a single layer;
   the single tube being free of an extra layer for adhesiveness;
   the single tube formed by a single material selected from the group consisting of ethylene vinyl acetate (EVA) and polyethylene;
   the single tube having an outer diameter ranging from 2.0 to 6.0 mm, and an inner diameter ranging from 1.0 to 5.0 mm;
   the pyrotechnical mixture forming a thin layer in contact with the single layer of the single tube;
   the pyrotechnical mixture being in a quantity of 5 to 40 mg per meter of the single tube;
   the single material is linear low-density polyethylene (LLDPE);
   the agent for lubricating and adhering being selected from the group consisting of talc, graphite and a combination thereof; and
   a content of the agent for lubricating and adhering being within the range of 0.5% to 3.0% by weight.

2. The spark generating tube as claimed in claim 1, comprising
   the oxidizer being selected from the group consisting of ferrous ferric oxide, ferric oxide, ferrous oxide, cobalt oxide, cupric oxide, cuprous oxide and any combination thereof; and
   a content of the oxidizer being within the range of 15% to 35% by weight.

3. The spark generating tube as claimed in claim 1, comprising
   the reducing agent being selected from the group consisting of aluminum, magnesium, silicon, boron and zirconium and any combination thereof; and
   a content of the reducing agent being within the range of 32% to 60% by weight.

4. The spark generating tube as claimed in claim 1, comprising
   the substance with low temperature of Tammann being selected from the group consisting of potassium perchlorate, potassium chlorate, potassium nitrate, ammonium perchlorate, sodium perchlorate, sulfur, antimony trisulfide and any combination thereof; and
   a content of the substance with low temperature of Tammann being within the range of 20% to 40% by weight.

5. The spark generating tube as claimed in claim 1, comprising
 the spark generating tube maintaining a normal functionality after 24 hours of exposure to a pure marine diesel at 65° C.;
 the spark generating tube maintaining a normal functionality after 48 hours of exposure to a pure marine diesel at 40° C., wherein the pure marine diesel is presented in hot explosive emulsions; and
 generated sparks being formed as much by gases as by melted metals.

6. The spark generating tube as claimed in claim 1, comprising
 15% to 35% of powder ferrous ferric oxide (Fe3O4);
 32% to 60% of powdered aluminum;
 20% to 40% of potassium perchlorate ($KClO_4$);
 0.5% to 3% of talc; and
 the powdered aluminum being micro-metric powder.

7. The spark generating tube as claimed in claim 6, comprising
 27.5% of powder ferrous ferric oxide (Fe3O4);
 40% of powdered aluminum;
 31.5% of potassium perchlorate ($KClO_4$); and
 1% of talc.

8. A spark generating tube, comprising
 a single tube;
 a pyrotechnical mixture;
 the single tube formed by a single layer;
 the single tube being free of an extra layer for adhesiveness;
 the single tube formed by a single material selected from the group consisting of ethylene vinyl acetate (EVA) and polyethylene;
 the single tube having an outer diameter ranging from 2.0 to 6.0 mm, and an inner diameter ranging from 1.0 to 5.0 mm;
 the pyrotechnical mixture forming a thin layer in contact with the single layer of the single tube;
 the pyrotechnical mixture being in a quantity of 5 to 40 mg per meter of the single tube;
 the spark generating tube maintaining a normal functionality after 24 hours of exposure to a pure marine diesel at 65° C.;
 the spark generating tube maintaining a normal functionality after 48 hours of exposure to a pure marine diesel at 40° C., wherein the pure marine diesel is presented in hot explosive emulsions;
 generated sparks being formed as much by gases as by melted metals;
 the single material is linear low-density polyethylene (LLDPE);
 the pyrotechnical mixture comprising an oxidizer, a reducing agent, a substance with low temperature of Tammann, wherein the low temperature of Tammann refers to 30° C. to 200° C., an agent for lubricating and adhering; the oxidizer, the reducing agent, the substance with a low temperature of Tammann and the agent for lubricating and adhering being in respective powder forms; the reducing agent being in a microscale, wherein the microscale refers to the metric level of 1 nm to 100 nm; the agent for lubricating and adhering being selected from the group consisting of talc, graphite and a combination thereof; and a content of the agent for lubricating and adhering being within the range of 0.5% to 3.0% by weight.

9. The spark generating tube as claimed in claim 8, comprising the oxidizer being selected from the group consisting of ferrous ferric oxide, ferric oxide, ferrous oxide, cobalt oxide, cupric oxide, cuprous oxide and any combination thereof;
 a content of the oxidizer being within the range of 15% to 35% by weight;
 the reducing agent being selected from the group consisting of aluminum, magnesium, silicon, boron and zirconium and any combination thereof; and
 a content of the reducing agent being within the range of 32% to 60% by weight.

10. The spark generating tube as claimed in claim 8, comprising
 the substance with low temperature of Tammann being selected from the group consisting of potassium perchlorate, potassium chlorate, potassium nitrate, ammonium perchlorate, sodium perchlorate, sulfur, antimony trisulfide and any combination thereof; and
 a content of the substance with low temperature of Tammann being within the range of 20% to 40% by weight.

11. The spark generating tube as claimed in claim 8, comprising
 15% to 35% of powder ferrous ferric oxide (Fe3O4);
 32% to 60% of powdered aluminum;
 20% to 40% of potassium perchlorate ($KClO_4$);
 0.5% to 3% of talc; and
 the powdered aluminum being micro-metric powder.

12. The spark generating tube as claimed in claim 11, comprising
 27.5% of powder ferrous ferric oxide (Fe3O4);
 40% of powdered aluminum;
 31.5% of potassium perchlorate ($KClO_4$); and
 1% of talc.

13. A process for manufacturing a spark generating tube as claimed in claim 8, comprising the steps of
 mixing a powdered oxidizer, a powdered substance with low temperature of Tammann and a powdered agent for lubricating and adhering, so as to obtain a first mixture, the first mixture being free of reducing agent;
 reducing a particle size of the first mixture obtained in the step of mixing;
 feeding the first mixture obtained in the reducing step into a first dozing silo, and feeding a micro-metric reducing agent powder into a second dosing silo;
 continuously dosing the first mixture and the micro-metric reducing agent according to a pre-determined proportion through two parallel dosing devices, which are provided with an extruder, an extrusion ring of the extruder being connected to a bottom screen of a roll homogenizer-mixer, and the second mixture continuously reaching the bottom screen;
 extruding a single tube with the extruder, and simultaneously the dosed first mixture and micro-metric reducing agent according to the pre-determined proportion falling into the extruded single tube by gravity to form a second mixture only inside the extruded single tube, wherein the second mixture is a pyrotechnical mixture; and
 obtaining the spark generating tube comprising the single tube and the pyrotechnical mixture inside the single tube.

14. The process for manufacturing a spark generating tube as claimed in claim 13, comprising
 the single tube having only a single layer;
 the single tube being free of an extra layer for adhesiveness;

the single tube formed by a single material selected from the group consisting of ethylene vinyl acetate (EVA) and polyethylene;

the single tube having an outer diameter ranging from 2.0 to 6.0 mm, and an inner diameter ranging from 1.0 to 5.0 mm;

the pyrotechnical mixture forming a thin layer in contact with the single layer of the single tube; and the pyrotechnical mixture being in a quantity of 5 to 40 mg per meter of the single tube.

15. The process for manufacturing a spark generating tube as claimed in claim 13, comprising:

the oxidizer being selected from the group consisting of ferrous ferric oxide, ferric oxide, ferrous oxide, cobalt oxide, cupric oxide, cuprous oxide and any combination thereof;

a content of the oxidizer being within the range of 15% to 35% by weight;

the reducing agent being selected from the group consisting of aluminum, magnesium, silicon, boron and zirconium and any combination thereof;

a content of the reducing agent being within the range of 32% to 60% by weight;

the substance with low temperature of Tammann being selected from the group consisting of potassium perchlorate, potassium chlorate, potassium nitrate, ammonium perchlorate, sodium perchlorate, sulfur, antimony trisulfide and any combination thereof;

a content of the substance with low temperature of Tammann being within the range of 20% to 40% by weight;

the agent for lubricating and adhering being selected from the group consisting of talc, graphite and a combination thereof; and a content of the agent for lubricating and adhering being within the range of 0.5% to 3.0% by weight.

16. The process for manufacturing a spark generating tube as claimed in claim 13, comprising:

the spark generating tube maintaining a normal functionality after 24 hours of exposure to a pure marine diesel at 65 o C;

the spark generating tube maintaining a normal functionality after 48 hours of exposure to a pure marine diesel at 40 o C, wherein the pure marine diesel is presented in hot explosive emulsions; and generated sparks being formed as much by gases as by melted metals.

* * * * *